J. S. EGGLESTON.

Lubricating Axles for Vehicles.

No. 5,466. Reissued June 24, 1873.

Witnesses:

T. C. Brecht.

H. Norris

Inventor:

Jesse S. Eggleston by

James L. Norris.

Attorney.

AM. PHOTO-LITHOGRAPHIC CO. N.Y. (OSBORNE'S PROCESS.)

UNITED STATES PATENT OFFICE.

JESSE SCOTT EGGLESTON, OF AUBURN, NEW YORK, ASSIGNOR, BY MESNE ASSIGNMENTS, OF ONE-HALF INTEREST TO E. H. KELLOGG, OF NEW YORK CITY.

IMPROVEMENT IN LUBRICATING-AXLES FOR VEHICLES.

Specification forming part of Letters Patent No. 122,374, dated January 2, 1872; reissue No. 5,466, dated June 24, 1873; application filed March 26, 1873.

*To all whom it may concern:*

Be it known that I, JESSE SCOTT EGGLESTON, of Auburn, in the county of Cayuga and State of New York, have invented a new and useful Improvement in Lubricating-Axles for Vehicles, of which the following is a specification:

This invention relates to means for lubricating axles of vehicles, cars, &c., by which a constant and effective flow of lubricant is attained. This invention consists in arranging a cap-plate within the top portion of a cavity or recess formed in the upper portion of a carriage-axle, or other journal, so as to cover the lubricant in such a manner that a secondary chamber may be created between the top-plate and the inner surface of the carriage axle-box, as the axle is round and the cap-plate has a plane or flat-top surface. The invention also relates to an effective method of conducting and distributing the oil from the reservoir or recess in the axle to the bearing-surface, and consists in the employment of a cap-plate for said recess, which plate is provided with one or more pendent tubes, through which passes a wick, or other absorbent material, for conducting, by capillary attraction, the oil to the bearing or friction surface. The invention further consists in providing said cap-plate with openings forming passages for reconducting the oil into the reservoir after its distribution over the journal, thus obviating all unnecessary waste or escape of the lubricant.

Figure 1:
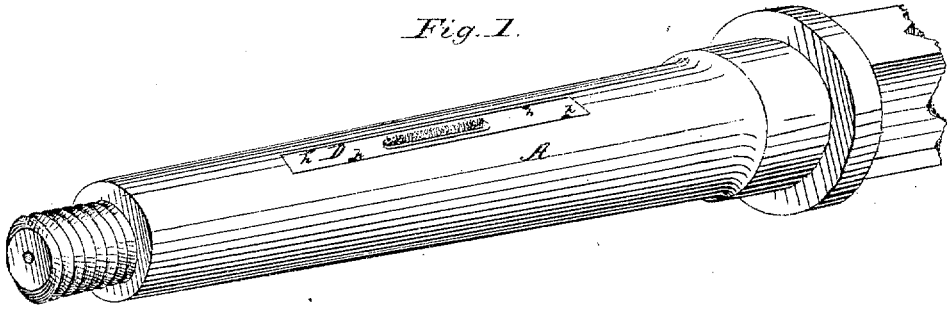
Figure 2:
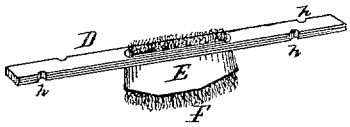
Figure 3:
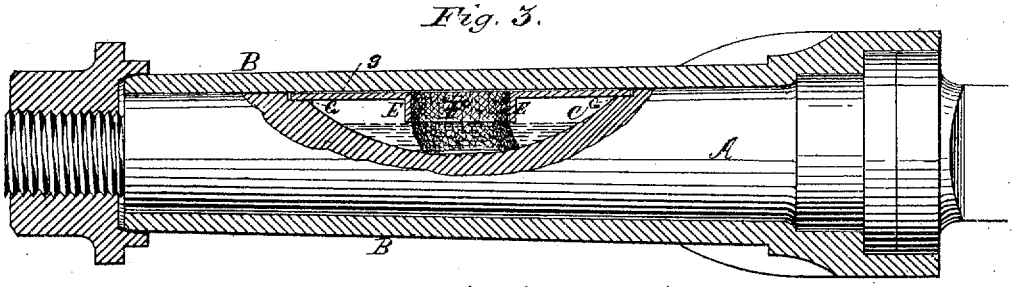
Figure 4:
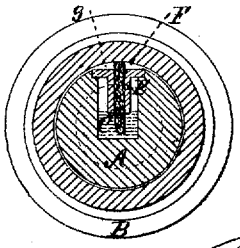

In the accompanying drawing, Figure 1 is a perspective view of an axle-arm, illustrating a cap with wicks inserted in a chamber formed in the top of the axle-arm. Fig. 2 is a perspective view of the cap carrying the wick-tube and wick. Fig. 3 is a central longitudinal section of an axle-arm and axle-box, illustrating one form of chamber or recess conforming to my invention. Fig. 4 is a section of Figs. 1 and 3 on the lines *y y* and *z z*.

In the present instance the proposed system of lubrication is especially adapted for carriage-axles; but I do not confine myself thereto, as it may be employed in lubricating car-axles and journals of various kinds of machinery.

A in the drawing designates a vehicle-axle, which is encompassed by the usual box B, and combined with the usual appendages. In the upper surface of the axle, between the joint and heel, but generally at a short distance from the latter, is formed a recess or chamber, C, provided with closed end walls, G, and of any desired depth or capacity. Said recess is designed to serve as a reservoir for the oil, or other lubricating materials, and it differs from devices heretofore in use, in which longitudinal channels are formed that permit the escape of the oil at the ends of the journal, causing an unnecessary waste, the oil escaping at the front and rear ends and running down upon the hub, and eventually injuring the same. In order to insure a proper and constant distribution of the lubricant to the bearing-surface, I provide the recess C with a cap-plate, D, which is let into the axle, so as to cover the lubricant in the channel and prevent an undue overflow of the same. The cap-plate is made flat on its top surface, so that when it is inserted into the axle-arm, the latter being round, the secondary chamber will be formed between the cap-plate and the axle-box. The plate is provided with one or more pendent-tubes, E, through which passes a wick, F, or a suitable absorbent material, which, by capillary action, will serve to elevate the oil from the recess C to the bearing-surface, causing a constant and regular flow. The lubricant, after its distribution over the entire journal by the revolution of the wheel, is conducted into the secondary chamber or recess, between the cap-plate and box, through one or more openings, *h*, back into the cavity or recess C, by means of openings formed in the edges of the cap-plate D.

From the above description it will be perceived that a recess or oil-reservoir provided with closed ends is not liable to permit the escape of oil in any other direction, except through the cap-plate, through the medium of the capillary conductor, and thus all unnecessary waste is avoided, which is a decided desideratum.

I claim as new and desire to secure by Letters Patent—

1. The journal of a vehicle-axle having a cavity or recess in its upper portion to contain a lubricant, in combination with a removable cap-plate, D, supported in the top portion of the cavity, substantially as described, for the object specified.

2. A cap-plate having one or more pendent tubes, E, in combination with an axle-journal or spindle having a cavity or recess, C, substantially as described.

3. In combination with the cap-plate D and an axle having oil-recess, C, the tube or tubes E, and capillary conductor F, for effecting a distribution of the lubricant, as herein set forth.

4. The cap-plate D having one or more openings, *h*, in combination with an axle-journal or spindle having a cavity or recess, C, substantially as described.

5. The cap-plate D, in combination with a journal or spindle having a cavity or recess, C, to form a secondary chamber, *g*, substantially as and for the purpose specified.

JESSE SCOTT EGGLESTON.

Witnesses:
JAMES L. NORRIS,
WM. J. PEYTON.